No. 637,376. Patented Nov. 21, 1899.
A. DUNSKY.
PROCESS OF MANUFACTURING INLAID WORK.
(Application filed Dec. 13, 1898.)
(No Model.)

WITNESSES:
Ella L. Giles

INVENTOR
Alfred Dunsky
BY
Richards & Co
ATTORNEYS

UNITED STATES PATENT OFFICE.

ALFRED DUNSKY, OF BERLIN, GERMANY.

PROCESS OF MANUFACTURING INLAID WORK.

SPECIFICATION forming part of Letters Patent No. 637,376, dated November 21, 1899.

Application filed December 13, 1898. Serial No. 699,179. (No specimens.)

*To all whom it may concern:*

Be it known that I, ALFRED DUNSKY, architect, of Krausenstrasse 11, Berlin, Germany, have invented a certain new and useful Improvement in Processes of Manufacturing Inlaid Work; and I do hereby declare the nature of this invention and in what manner the same is to be performed to be particularly described and ascertained in and by the following statement.

In marquetry the process hitherto employed consisted in inlaying ornaments of the style desired into the surface of the base. Various materials have been employed for the purpose. They belonged to the same class as the base—for instance, wood was inlaid in wood—or enameled fields, glass or ivory plates, metal ornaments or mosaic work were made use of. This art has been characterized by the fact that the ornaments for the marquetry work had to be inlaid in the base in a finished condition. It has not been possible for the surface of the ornaments and the surface of the base to be worked in a uniform manner. Even with the inlaid colored woods it was not possible to produce an enhanced effect by scraping the whole surface with a scraper and polishing it subsequently, because this operation would have injured the colored layer of the inlaid woods. The marquetry thus forms always a foreign body in its base, which deranges the artistic effect on the whole surface even with faultless execution of detail. Moreover, valuable material must be used to produce colored ornaments in richly-tinted color effects—such as enamel, mosaic work, and metal—and, as a matter of course, they make the work extraordinarily expensive.

The subject of the present invention is a process which obviates all the drawbacks of the art as hitherto practiced, produces perfect artistic effects, is cheap in execution, and renders it possible to treat the surface uniformly and to finish the same after the inlaying.

Figure 1:
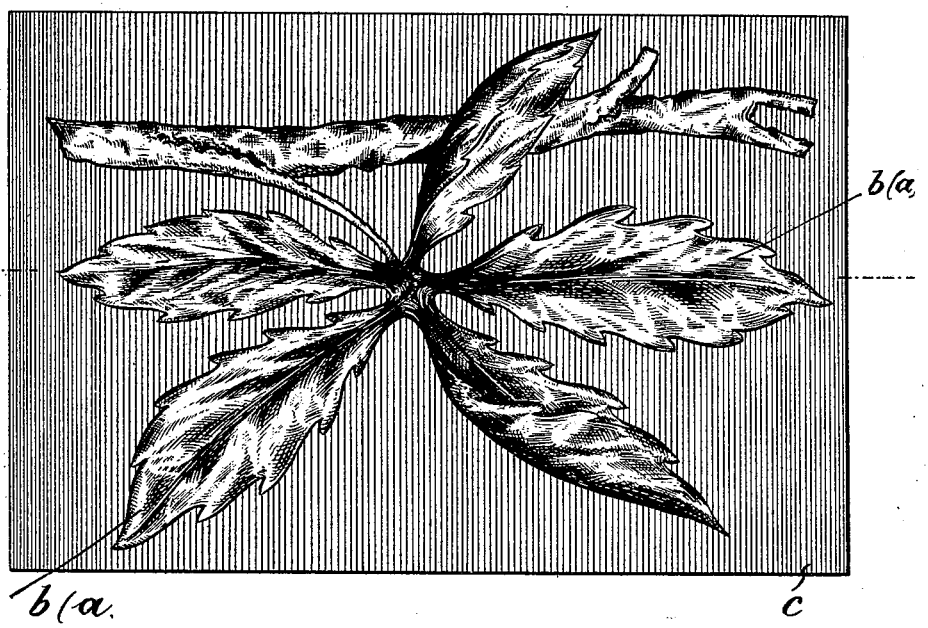
Figure 2:
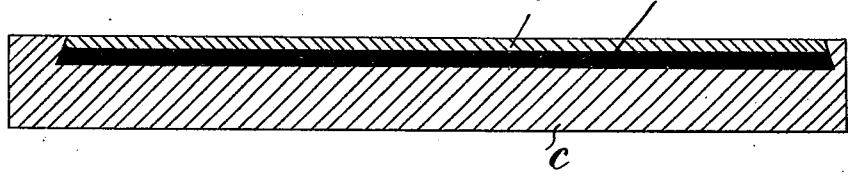

The present process will be understood most readily by reference to the accompanying drawings, Figures 1 and 2, which represent, respectively, a plan and sectional view of the invention.

In the drawings, $a$ represents the marquetry to be inlaid—textile fabric, metal, or the like. $b$ is the transparent covering-layer, which follows precisely the outlines of the marquetry, and $c$ is the piece of work into which the ornament is to be inlaid.

The following will be manifest at a glance: First, the condition, quality, and shape of the ornament to be inlaid, whether metal, fabric, flowers, colors, &c., are left entirely to the wish or taste of the artist, and there is no need to consider the physical qualities of the materials, as, second, the inlaid subjects are completely protected by the transparent covering-layer over them, which is preferably of horn; third, the covering-layer $b$ is situated flush with the surface of the base to be inlaid. The layer is transparent or translucent, follows the outlines of the ornament, and possesses the physical properties required to adapt the surface in any manner desired for the purposes of polishing. Horn has been recognized hitherto as the most suitable material. This arrangement makes it possible that, fourth, the piece to be worked can be treated in the same manner as an undivided coherent surface—that is, the work can be scraped, polished, varnished, &c., on the whole surface without regard to the inlaid marquetry. In brief, everything can be done that is material to the purpose in view.

By this process a new field is opened to the whole art of inlaid ornament, marquetry, and similar work, which is made independent of materials which are often brittle. The surface can be treated artistically in the fullest manner, and the cost of this process is very insignificant in proportion to the artistic effect obtained.

I claim as my invention—

The herein-described process for making inlaid work or marquetry consisting in placing the material in a depression in the base and placing a transparent covering over said material, flush with the surface of the base and working or finishing the exposed surface of the base and coating together, substantially as described.

In witness whereof I have hereunto set my hand in presence of two witnesses.

ALFRED DUNSKY.

Witnesses:
PAUL SCHULZ,
ANTON LIPPERT.